United States Patent
Jo et al.

(10) Patent No.: US 12,045,087 B2
(45) Date of Patent: Jul. 23, 2024

(54) ELECTRONIC DEVICE COMPRISING POLARIZING MEMBER AND PHASE DELAY MEMBER FOR BLOCKING LIGHT REFLECTED BY SENSOR DISPOSED BELOW DISPLAY

(71) Applicant: SAMSUNG ELECTRONICS CO., LTD., Suwon-si (KR)

(72) Inventors: Jeonggyu Jo, Suwon-si (KR); Bokyung Sim, Suwon-si (KR); Daekwang Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 962 days.

(21) Appl. No.: 17/045,230

(22) PCT Filed: Apr. 18, 2019

(86) PCT No.: PCT/KR2019/004714
§ 371 (c)(1),
(2) Date: Oct. 5, 2020

(87) PCT Pub. No.: WO2019/203598
PCT Pub. Date: Oct. 24, 2019

(65) Prior Publication Data
US 2021/0157362 A1    May 27, 2021

(30) Foreign Application Priority Data
Apr. 18, 2018    (KR) .................. 10-2018-0045123

(51) Int. Cl.
*G02B 5/30*    (2006.01)
*G02B 5/20*    (2006.01)
(Continued)

(52) U.S. Cl.
CPC ........... *G06F 1/1609* (2013.01); *G02B 5/208* (2013.01); *G02B 27/28* (2013.01); *G06F 1/1686* (2013.01);
(Continued)

(58) Field of Classification Search
CPC ... G02B 1/04; G02B 1/08; G02B 5/20; G02B 5/26; G02B 5/30; G02B 5/208;
(Continued)

(56) References Cited

U.S. PATENT DOCUMENTS

| 10,306,773 B2 | 5/2019 | Kim et al. |
| 2009/0153451 A1 | 6/2009 | Takama et al. |

(Continued)

FOREIGN PATENT DOCUMENTS

| CN | 105393261 | 3/2016 |
| CN | 107092311 | 8/2017 |

(Continued)

OTHER PUBLICATIONS

International Search Report for PCT/KR2019/004714 mailed Jul. 24, 2019, 4 pages.
(Continued)

*Primary Examiner* — Chanh D Nguyen
*Assistant Examiner* — Nguyen H Truong
(74) *Attorney, Agent, or Firm* — Nixon & Vanderhye, P.C.

(57) ABSTRACT

The present invention relates to a method for improving the visibility of a display and an electronic device for implementing same, the electronic device comprising: a display panel including a polarization layer and a phase delay layer; an impact absorbing member disposed below the display panel and having an opening; an image sensor disposed corresponding to the opening; a first phase delay member disposed below the display panel to correspond to the
(Continued)

opening such that a part of the light passed through the display panel and rotating in a circular direction of a first direction vibrates linearly in the first direction; a polarizing member disposed below the first phase delay member; and a second phase delay member disposed below the polarizing member such that a part of the light transmitted through the polarizing member and vibrating linearly in the first direction may rotate in a circular direction of a second direction.

10 Claims, 7 Drawing Sheets

(51) Int. Cl.
    *G02B 27/28*       (2006.01)
    *G06F 1/16*        (2006.01)
    *G06F 3/042*       (2006.01)
    *G06V 40/13*       (2022.01)

(52) U.S. Cl.
    CPC ............ *G06F 3/042* (2013.01); *G06F 3/0428* (2013.01); *G06V 40/1318* (2022.01)

(58) Field of Classification Search
    CPC ........ G02B 27/00; G02B 27/14; G02B 27/22; G02B 27/28; H10K 50/80; G09K 19/50; H01L 27/32; H01L 27/146; H01L 51/52; H01L 33/08; G06V 10/14; G06V 40/13; G06V 40/1318; G02F 1/1335; G02F 1/13363; G06F 1/16; G06F 1/1609; G06F 1/1686; G06F 3/042; G06F 3/0428; G10K 11/34; G01J 1/04; G01J 1/42; G01J 4/04; G06K 9/00; H05K 9/00
    See application file for complete search history.

(56) References Cited

U.S. PATENT DOCUMENTS

| | | | |
|---|---|---|---|
| 2011/0267561 | A1 | 11/2011 | Nemoto et al. |
| 2014/0063369 | A1 | 3/2014 | Hosorogiya et al. |
| 2014/0354596 | A1 | 12/2014 | Djordjev et al. |
| 2016/0216540 | A1 | 7/2016 | Cho et al. |
| 2017/0017824 | A1* | 1/2017 | Smith .................... G02B 6/005 |
| 2017/0046558 | A1 | 2/2017 | Li et al. |
| 2017/0300736 | A1 | 10/2017 | Song et al. |
| 2017/0303853 | A1 | 10/2017 | McMillen et al. |
| 2017/0364763 | A1 | 12/2017 | Jin et al. |
| 2018/0096187 | A1 | 4/2018 | Kwon et al. |
| 2018/0160545 | A1 | 6/2018 | Kim et al. |
| 2018/0314096 | A1 | 11/2018 | Yang et al. |
| 2018/0337219 | A1* | 11/2018 | Rhee .................... G02B 5/3025 |
| 2019/0079236 | A1* | 3/2019 | Hung .................... H10K 59/00 |
| 2019/0113387 | A1 | 4/2019 | Lee et al. |
| 2019/0157337 | A1* | 5/2019 | Lin .................... G06V 40/1318 |
| 2019/0205593 | A1* | 7/2019 | Kim .................... G06F 1/1696 |
| 2019/0228204 | A1 | 7/2019 | Park et al. |
| 2019/0303640 | A1 | 10/2019 | Song et al. |
| 2020/0050823 | A1* | 2/2020 | Jiang .................... G06V 40/1318 |

FOREIGN PATENT DOCUMENTS

| | | |
|---|---|---|
| CN | 107526953 | 12/2017 |
| CN | 107918450 | 4/2018 |
| EP | 1 657 573 | 5/2006 |
| EP | 3 236 390 | 10/2017 |
| IN | 207115247 | 3/2018 |
| JP | 2009-169400 | 7/2009 |
| JP | 5335901 | 11/2013 |
| JP | 2014-052479 | 3/2014 |
| KR | 10-2005-0100454 | 10/2005 |
| KR | 10-2016-0092150 | 8/2016 |
| KR | 10-1784781 | 10/2017 |
| KR | 10-2017-0141522 | 12/2017 |
| KR | 10-2017-0143351 | 12/2017 |
| KR | 10-2018-0001904 | 1/2018 |
| KR | 10-1841583 | 3/2018 |
| KR | 10-2018-0037799 | 4/2018 |
| WO | 2018/004243 | 1/2018 |

OTHER PUBLICATIONS

Written Opinion of the ISA for PCT/KR2019/004714 mailed Jul. 24, 2019, 4 pages.
Office Action dated Feb. 17, 2023 in Korean Application No. 10-2018-0045123 and English-language translation.
Extended Search Report dated May 11, 2021 in counterpart European Patent Application No. 19788753.2.
Notification of First Office Action dated May 18, 2022 in counterpart Chinese Patent Application No. 201980022534.5 and English-language translation.
Office Action dated Aug. 30, 2023 in Korean Application No. 10-2018-0045123 and English-language translation.

* cited by examiner

ELECTRONIC DEVICE COMPRISING POLARIZING MEMBER AND PHASE DELAY MEMBER FOR BLOCKING LIGHT REFLECTED BY SENSOR DISPOSED BELOW DISPLAY

This application is the U.S. national phase of International Application No. PCT/KR2019/004714 filed Apr. 18, 2019 which designated the U.S. and claims priority to KR Patent Application No. 10-2018-0045123 filed Apr. 18, 2018, the entire contents of each of which are hereby incorporated by reference.

BACKGROUND

Field

Various embodiments of the disclosure relate to an electronic device including a polarizing member and a phase delay member for blocking light reflected by a sensor disposed below a display.

Description of Related Art

The role of a display is becoming important in portable electronic devices, and in particular, the area occupied by the display is gradually increasing. According to the increase of the area occupied by the display in the limited size of a portable electronic device, a physical button (for example, a home key) located in the front of the portable electronic device may be removed and the portable electronic device may display, on the display, a user interface to replace the removed physical button. The physical button may include a bio-sensor (for example, a fingerprint sensor), and as the physical button is removed, the bio-sensor may be disposed below a display of a portable electronic device. In a portable electronic device, a fingerprint sensor which is one of bio-sensors may be disposed below a display, and a portion of a display region of the display may be configured as a fingerprint sensing region for recognizing a user's fingerprint, while corresponding to a point (for example, a position and a coordinate) where the fingerprint sensor is disposed.

In a portable electronic device, a fingerprint sensor may be disposed below a display, and the fingerprint sensor may be linked with the display so as to recognize a user's fingerprint input through the display. For example, in a display region of a display, a region where a fingerprint sensor is disposed may be a fingerprint sensing region. A portable electronic device may recognize a user's fingerprint by means of the fingerprint sensing region. A portable electronic device may perform a user authentication function, based on the recognized fingerprint.

SUMMARY

According to various embodiments, a fingerprint sensor may be disposed below a display. In order to recognize a user's fingerprint by using the fingerprint sensor, some components mounted in an electronic device may be implemented in a different arrangement structure and form. For example, in order to recognize a user's fingerprint input through a display, an opening may be formed through at least one sheet (for example, an embossed sheet, a cushiony sheet, a metal sheet, and a heat-dissipating sheet) at a position corresponding to a fingerprint sensing region of a fingerprint sensor. As an opening is formed corresponding to a fingerprint sensing region, in a screen displayed on a display, a screen corresponding to the fingerprint sensing region may be differently displayed. For example, at least a part of a fingerprint sensor may be visible to the naked eye through the opening while a screen is off. In addition, when the light from the outside is reflected by a display while a screen is on, a reflectance of a fingerprint sensing region is different from a reflectance of a region other than the fingerprint sensing region, and thus the fingerprint sensing region corresponding to a point where a fingerprint sensor is disposed may be dimly displayed.

An electronic device according to various embodiments of the disclosure may include a filter and an organic material disposed corresponding to a fingerprint sensing region in order to prevent a fingerprint sensor disposed, corresponding to the fingerprint sensing region, below a display from being visible or prevent visibility degradation of a screen corresponding to the fingerprint sensing region. An electronic device may prevent a fingerprint sensor from being visible or visibility degradation of a screen corresponding to a fingerprint sensing region by means of a filter and an organic material.

An electronic device according to various embodiments of the disclosure may include: a display panel including a polarizing layer and a phase delay layer disposed below the polarizing layer; an impact absorbing member disposed below the display panel and having an opening formed through at least a part thereof; an image sensor disposed corresponding to the opening; a first phase delay member disposed, corresponding to the opening, below the display panel, to enable at least a part of light passing through the polarizing layer and the phase delay layer of the display panel and rotating circularly in a first direction, to vibrate linearly in the first direction; a polarizing member disposed below the first phase delay member to enable at least a part of the light vibrating linearly in the first direction, to be transmitted therethrough; and a second phase delay member disposed below the polarizing member to enable at least a part of the light vibrating linearly in the first direction, the light having been transmitted through the polarizing member, to rotate circularly in a second direction, wherein the second phase delay member has an optical property such that at least a part of the light rotating circularly in the second direction collides with the image sensor to be reflected toward the second phase delay member, and the reflected light rotating circularly in the second direction is changed to the light vibrating linearly in the second direction different from the first direction by means of the second phase delay member so as to be blocked by the polarizing member.

An electronic device according to various embodiments of the disclosure may include: a display panel including a polarizing layer and a phase delay layer disposed below the polarizing layer; an impact absorbing member disposed below the display panel and having an opening at least partially formed therein; an image sensor disposed corresponding to the opening; a polarizing member disposed, corresponding to the opening, below the display panel to enable at least a part of light passing through the polarizing layer and the phase delay layer of the display panel to be transmitted therethrough; and a phase delay member disposed below the polarizing member to enable at least a part of the light having been transmitted through the polarizing member to be transmitted therethrough, wherein the phase delay member has an optical property such that at least a part of the light collides with the image sensor to be reflected toward the phase delay member, and the reflected light is blocked by the polarizing member.

An electronic device according to various embodiments of the disclosure may include: a display panel including a polarizing layer and a phase delay layer disposed below the polarizing layer; an impact absorbing member disposed below the display panel and having an opening at least partially formed therein; an image sensor disposed corresponding to the opening; and an organic material provided between the display panel and the image sensor to at least partially block transmission of light introduced from the outside.

An electronic device according to various embodiments of the disclosure may include a filter and an organic material disposed corresponding to a fingerprint sensing region in order to compensate a problem (for example, a problem in which at least a part of a screen is dimly displayed) in which due to a fingerprint sensor embedded under a display, the fingerprint sensor is visible or the visibility of a screen deteriorates. According to various embodiments of the disclosure, a filter and an organic material can prevent a fingerprint sensor from being visible and visibility degradation of a screen corresponding to a region where a fingerprint sensor is disposed. According to various embodiments of the disclosure, a filter and an organic material disposed corresponding to a fingerprint sensor are used, thereby improving phenomena in which a fingerprint sensor embedded under a display is visible and the visibility of a screen deteriorates.

DETAILED DESCRIPTION

Figure 1:
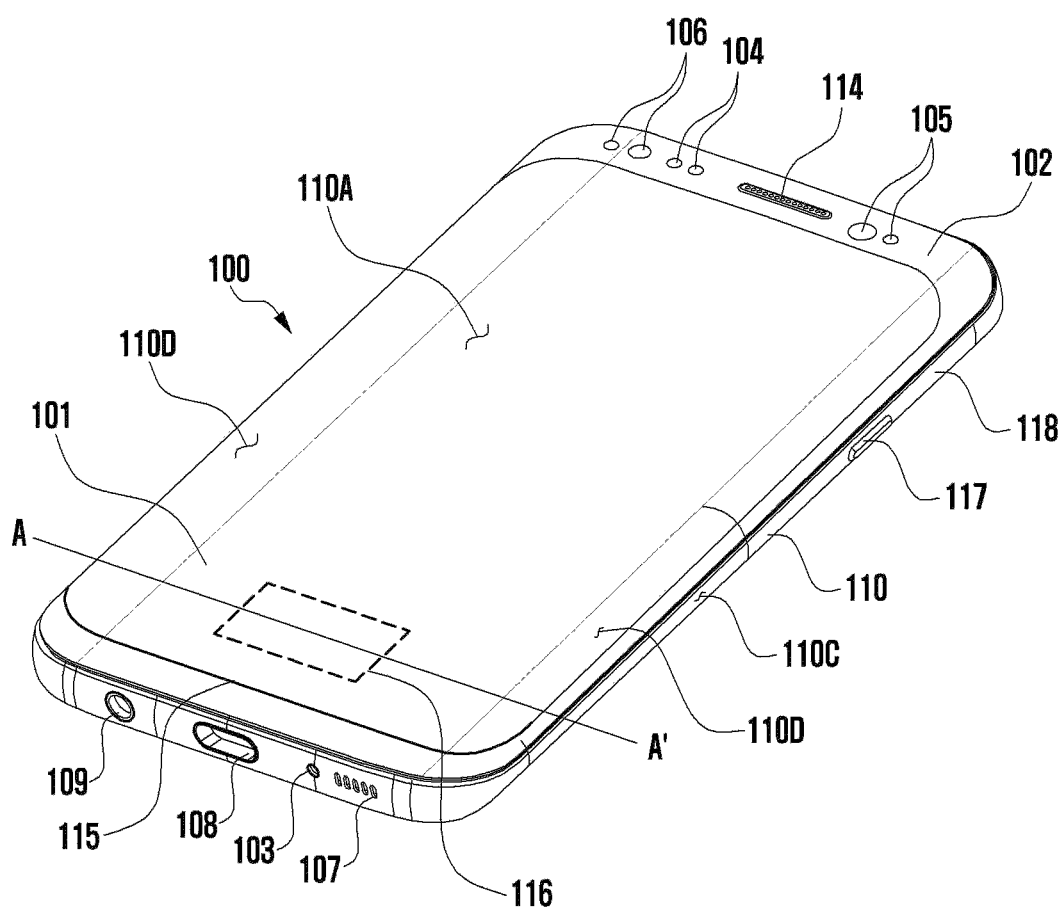
FIG. 1 is a perspective view illustrating a front surface of a mobile electronic device according to an embodiment of the disclosure.
Figure 2:
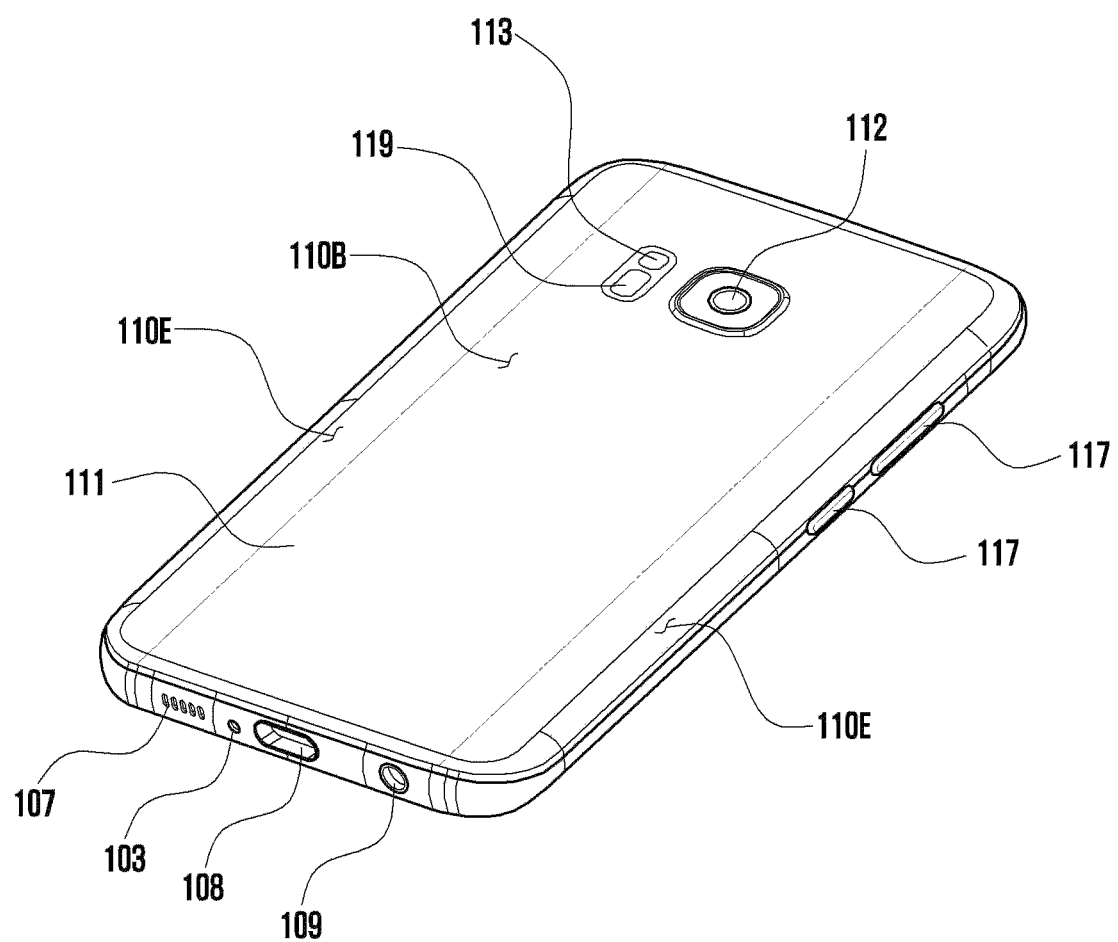
FIG. 2 is a perspective view illustrating a rear surface of the electronic device of FIG. 1 according to an embodiment of the disclosure.

Referring to FIGS. 1 and 2, according to an embodiment, an electronic device 100 may include a housing 110 that includes a first surface (or front surface) 110A, a second surface (or rear surface) 110B, and a lateral surface 110C that surrounds a space between the first surface 110A and the second surface 110B. According to another embodiment, the housing 110 may refer to a structure that forms a part of the first surface 110A, the second surface 110B, and the lateral surface 110C. According to an embodiment, the first surface 110A may be formed of a front plate 102 (e.g., a glass plate or polymer plate coated with a variety of coating layers) at least a part of which is substantially transparent. The second surface 110B may be formed of a rear plate 111 which is substantially opaque. The rear plate 111 may be formed of, for example, coated or colored glass, ceramic, polymer, metal (e.g., aluminum, stainless steel (STS), or magnesium), or any combination thereof. The lateral surface 110C may be formed of a lateral bezel structure (or "lateral member") 118 which is combined with the front plate 102 and the rear plate 111 and includes a metal and/or polymer. The rear plate 111 and the lateral bezel structure 118 may be integrally formed and may be of the same material (e.g., a metallic material such as aluminum).

In the shown embodiment, the front plate 102 may include two first regions 110D disposed at long edges thereof, respectively, and bent and extended seamlessly from the first surface 110A toward the rear plate 111. In the shown embodiment, the rear plate 111 may include two second regions 110E disposed at long edges thereof, respectively, and bent and extended seamlessly from the second surface 110B toward the front plate 102 (refer to FIG. 2). In various embodiments, the front plate 102 (or the rear plate 111) may include only one of the first regions 110D (or of the second regions 110E). In various embodiments, the first regions 110D or the second regions 110E may be omitted in part. In the embodiments, when viewed from a lateral side of the electronic device 100, the lateral bezel structure 118 may have a first thickness (or width) on a lateral side where one of the first regions 110D or one of the second regions 110E is not included, and may have a second thickness, being less than the first thickness, on another lateral side where one of the first regions 110D or one of the second regions 110E is included.

According to an embodiment, the electronic device 100 may include at least one of a display 101, audio modules 103, 107 and 114, sensor modules 104 and 119, camera modules 105, 112 and 113, key input devices 117, a light emitting device 106, and connector holes 108 and 109. In various embodiments, the electronic device 100 may omit at least one (e.g., the key input devices 117 or the light emitting device 106) of the above components, or may further include other components.

The display 101 may be exposed through a substantial portion of the front plate 102, for example. In various embodiments, at least a part of the display 101 may be exposed through the front plate 102 that forms the first surface 110A and the first regions 110D. In various embodiments, outlines (i.e., edges and corners) of the display 101 may have substantially the same form as those of the front plate 102. In another embodiment (not shown), the spacing between the outline of the display 101 and the outline of the front plate 102 may be substantially unchanged in order to enlarge the exposed area of the display 101.

In another embodiment (not shown), a recess or opening may be formed in a portion of a display area of the display 101 to accommodate at least one of the audio modules (e.g., the audio module 114), the sensor module 104, the camera module 105, and the light emitting device 106. In another embodiment (not shown), at least one of the audio modules (e.g., the audio module 114), the sensor module 104, the camera module 105, a fingerprint sensor (e.g., a biometric sensor), and the light emitting device 106 may be disposed on the back of the display area of the display 101. In another embodiment (not shown), the display 101 may be combined with, or adjacent to, a touch sensing circuit, a pressure sensor capable of measuring the touch strength (pressure), and/or a digitizer for detecting a stylus pen. In various embodiments, at least a part of the sensor modules 104 and 119 and/or at least a part of the key input devices 117 may be disposed in one of the first regions 110D and/or one of the second regions 110E.

The audio modules 103, 107 and 114 may correspond to a microphone hole (e.g., the audio module 103) and speaker holes (e.g., the audio modules 107 and 114). The microphone hole may contain a microphone disposed therein for acquiring external sounds and, in a case, contain a plurality of microphones to sense a sound direction. The speaker holes may be classified into an external speaker hole and a call receiver hole. In various embodiments, the microphone hole and the speaker holes may be implemented as a single hole, or a speaker (e.g., a piezo speaker) may be provided without the speaker holes.

The sensor modules 104 and 119 may generate electrical signals or data corresponding to an internal operating state of the electronic device 100 or to an external environmental condition. The sensor modules 104 and 119 may include a first sensor module (e.g., the sensor module 104) (e.g., a proximity sensor) and/or a second sensor module (e.g., a fingerprint sensor) disposed on the first surface 110A of the housing 110, and/or a third sensor module (e.g., the sensor module 119) (e.g., a heart rate monitor (HRM) sensor) and/or a fourth sensor module (not shown) (e.g., a fingerprint sensor) disposed on the second surface 110B of the housing 110. The fingerprint sensor 116 may be disposed under the second surface 110B as well as the first surface 110A (for example, the fingerprint sensor is embedded below the display 101) of the housing 110. At least a portion of the first surface 110A may be configured, corresponding to the fingerprint sensor 116 embedded below the display 101, as a fingerprint sensing region. The electronic device 100 may further include at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 105, 112 and 113 may include a first camera device (e.g., the camera module 105) disposed on the first surface 110A of the electronic device 100, and a second camera device (e.g., the camera module 112) and/or a flash (e.g., the camera module 113) disposed on the second surface 110B. The camera module 105 or the camera module 112 may include one or more lenses, an image sensor, and/or an image signal processor. The flash may include, for example, a light emitting diode or a xenon lamp. In various embodiments, two or more lenses (infrared cameras, wide angle and telephoto lenses) and image sensors may be disposed on one side of the electronic device 100.

The key input devices 117 may be disposed on the lateral surface 110C of the housing 110. In another embodiment, the electronic device 100 may not include some or all of the key input devices 117 described above, and the key input devices 117 which are not included may be implemented in another form such as a soft key on the display 101. In various embodiments, the key input devices 117 may include the sensor module (e.g., the fingerprint sensor 116) disposed on the first surface 110A of the housing 110.

The light emitting device 106 may be disposed on the first surface 110A of the housing 110, for example. For example, the light emitting device 106 may provide status information of the electronic device 100 in an optical form. In various embodiments, the light emitting device 106 may provide a light source associated with the operation of the camera module 105. The light emitting device 106 may include, for example, a light emitting diode (LED), an infrared (IR) LED, or a xenon lamp.

The connector holes 108 and 109 may include a first connector hole (e.g., the connector hole 108) adapted for a connector (e.g., a universal serial bus (USB) connector) for transmitting and receiving power and/or data to and from an external electronic device, and/or a second connector hole (e.g., the connector hole 109) adapted for a connector (e.g., an earphone jack) for transmitting and receiving an audio signal to and from an external electronic device.

Figure 3:
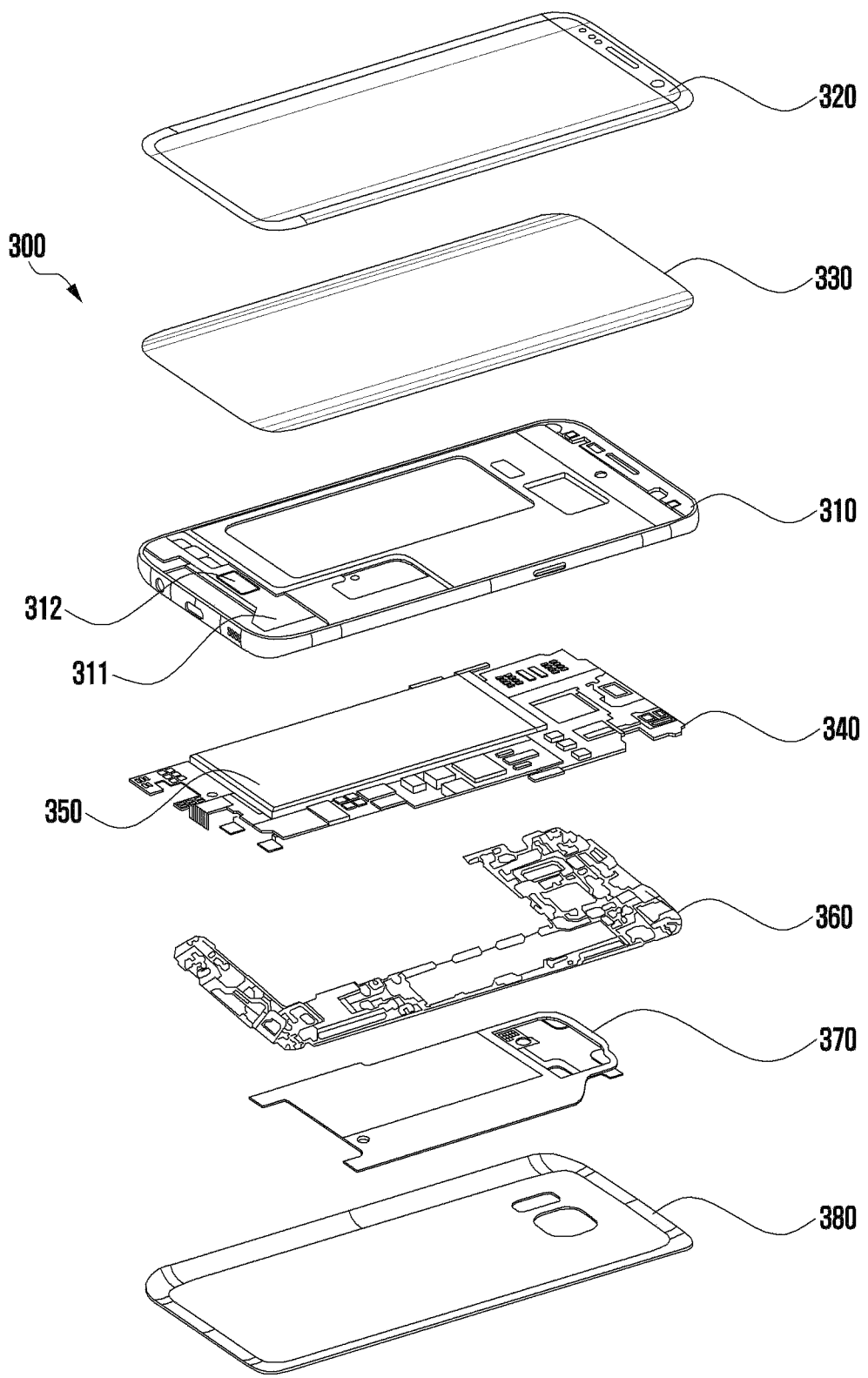
FIG. 3 is an exploded perspective view illustrating the electronic device of FIG. 1 according to an embodiment of the disclosure.

Referring to FIG. 3, an electronic device 300 (e.g., the electronic device 100 of FIG. 1) may include a lateral bezel structure 310, a first support member 311 (e.g., a bracket), a fingerprint sensor 312 (e.g., the fingerprint sensor 116), a front plate 320, a display 330 (e.g., the display 101), a printed circuit board (PCB) 340, a battery 350, a second support member 360 (e.g., a rear case), an antenna 370, and a rear plate 380. In various embodiments, the electronic device 300 may omit at least one (e.g., the first support member 311 or the second support member 360) of the above components or may further include another component. Some components of the electronic device 300 may be the same as or similar to those of the electronic device 100 shown in FIG. 1 or FIG. 2, thus, descriptions thereof are omitted below.

The first support member 311 is disposed inside the electronic device 300 and may be connected to, or integrated with, the lateral bezel structure 310. The first support member 311 may be formed of, for example, a metallic material and/or a non-metal (e.g., polymer) material. The first support member 311 may be combined with the display 330 at one side thereof and also combined with the PCB 340 at the other side thereof. On the PCB 340, a processor, a memory, and/or an interface may be mounted. The processor may include, for example, one or more of a central processing unit (CPU), an application processor (AP), a graphics processing unit (GPU), an image signal processor (ISP), a sensor hub processor, or a communications processor (CP).

The memory may include, for example, volatile memory or non-volatile memory.

The interface may include, for example, a high definition multimedia interface (HDMI), a USB interface, a secure digital (SD) card interface, and/or an audio interface. The interface may electrically or physically connect the electronic device 300 with an external electronic device and may include a USB connector, an SD card/multimedia card (MMC) connector, or an audio connector.

The battery 350 is a device for supplying power to at least one component of the electronic device 300, and may include, for example, a non-rechargeable primary battery, a rechargeable secondary battery, or a fuel cell. At least a part of the battery 350 may be disposed on substantially the same plane as the PCB 340. The battery 350 may be integrally disposed within the electronic device 300, and may be detachably disposed from the electronic device 300.

The antenna 370 may be disposed between the rear plate 380 and the battery 350. The antenna 370 may include, for example, a near field communication (NFC) antenna, a wireless charging antenna, and/or a magnetic secure transmission (MST) antenna. The antenna 370 may perform short-range communication with an external device, or transmit and receive power required for charging wirelessly. An antenna structure may be formed by a part or combination of the lateral bezel structure 310 and/or the first support member 311.

Figure 4:
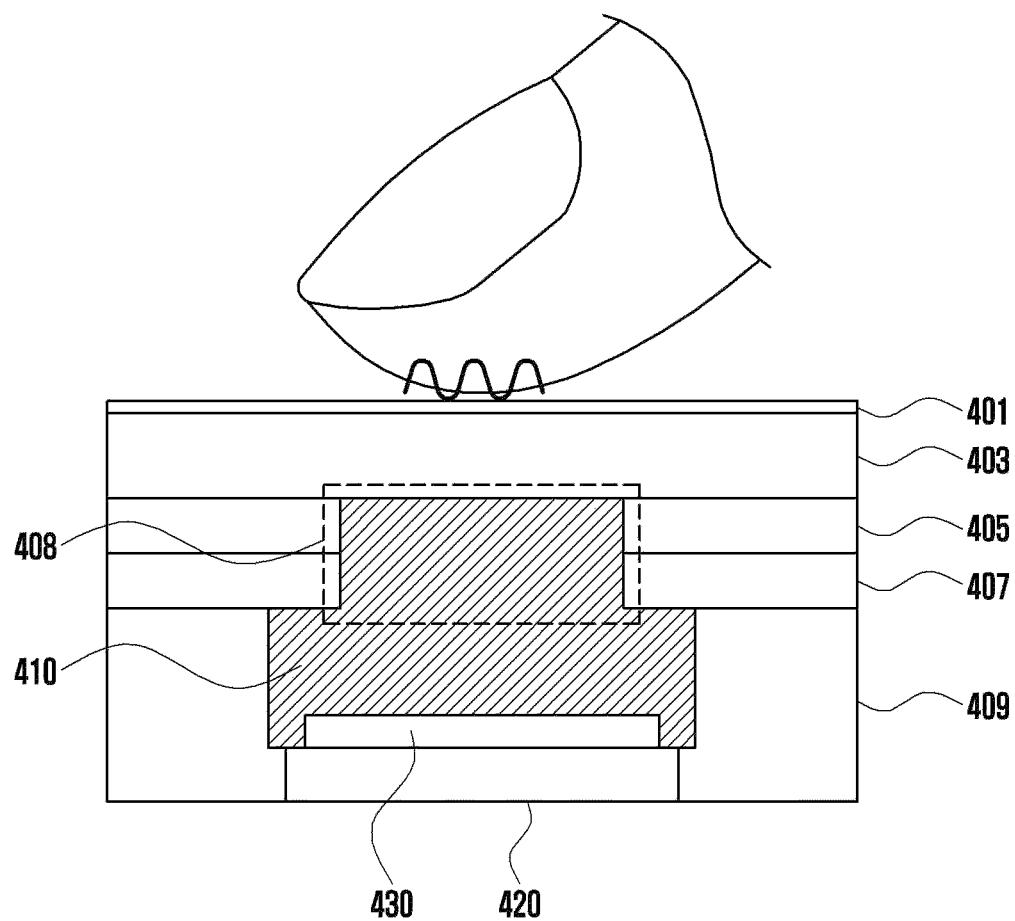
FIG. 4 illustrates an organic material disposed corresponding to a fingerprint sensor mounted inside an electronic device according to various embodiments of the disclosure.

FIG. 4 illustrates an organic material disposed corresponding to a fingerprint sensor mounted inside an electronic device according to various embodiments of the disclosure.

FIG. 4 illustrates a cross-sectional view of the electronic device 100 with respect to a fingerprint sensor 420 embedded in an electronic device (for example, the electronic device 100 of FIG. 1). The fingerprint sensor 420 may be disposed below a display 403 of the electronic device 100.

FIG. 4 may be a cross-sectional view, taken along line A-A' of FIG. 1, showing a configuration of the electronic device 100. The electronic device 100 includes the display 403 for displaying a screen, and the display 403 may be formed by laminating one or more panels (for example, a touch screen panel (TSP)). For example, the display 403 may include a polarizing layer and a phase delay layer disposed below the polarizing layer. A transparent protective member 401 (for example, a window, glass, a film, and the like) may be attached to an upper surface of the display 403, and a support member 405 (for example, an impact absorbing member, an embossed sheet, and/or a cushiony sheet) and a metal sheet 407 (for example, a graphite (Gr) sheet and/or a copper (Cu) sheet) may be attached to a lower surface of the display 403. Although not shown, an electromagnetic induction panel (for example, a digitizer) may be disposed below the display 403. The fingerprint sensor 420 may be disposed below the metal sheet 407, and a housing 409 may be included to fix an arrangement structure of the fingerprint sensor 420.

The transparent protective member 401 is a transparent panel, and may protect the display 403 from an external impact. The electronic device 100 may receive a user's touch input through the display 403, and the transparent protective member 401 may be attached to the upper surface of the display 403 so as to prevent the user's touch input from directly contacting the display 403. The transparent protective member 401 and the display 403 may be attached to each other by means of a transparent adhesive member (an optical clear adhesive (OCA), not shown).

The display 403 may display a screen under control of the electronic device 100. The display 403 may include a touch screen panel and receive a user's touch input through the touch screen panel. The touch screen panel may include a panel for sensing a touch input and a panel for displaying a screen.

The support member 405 is a member for absorbing an impact on the display 403 and may include an embossed sheet having an embossed pattern, a cushiony sheet including a sponge, and/or a black layer. The black layer may reflect light emitted from the display or block the light from being directed below the display.

The metal sheet 407 may diffuse heat generated inside the electronic device, thereby restraining a rise of temperature inside the electronic device 100 and shielding electromagnetic wave noise. The metal sheet 407 may include a sheet made of Cu. According to one embodiment, the metal sheet 407 may include a graphite (Gr) sheet in order to dissipate heat.

According to various embodiments, the fingerprint sensor 420 may be mounted below the support member 405 and the metal sheet 407, and an opening 408 may be formed through the support member 405 and the metal sheet 407 at a position corresponding to a fingerprint sensing region where a user's fingerprint is sensed in order to recognize the user's fingerprint by means of the fingerprint sensor 420. The fingerprint sensing region may be configured corresponding to a region where the fingerprint sensor 420 is disposed. A filter 430 for reflecting light introduced from the outside may be attached to an upper surface (for example, a part where the user's fingerprint is sensed) of the fingerprint sensor 420. According to various embodiments, the light may be introduced from the outside through the opening 408 formed through the support member 405 and the metal sheet 407, and the filter 430 may be attached to the upper surface of the fingerprint sensor 420 such that the introduced light does not affect fingerprint recognition. The filter 430 may include an infrared-ray blocking filter (for example, an IR cut filter) for blocking an infrared ray (IR) of the light introduced from the outside.

The fingerprint sensor may be visible through the opening 408 formed through the support member 405 and the metal sheet 407. For example, at least a part of the fingerprint sensor may be visible to the naked eye through the opening 408 while a screen of the display 101 is off. In addition, at least a part of a screen may be dimly or brightly displayed by the light introduced from the outside through the opening 408. For example, a region (for example, the fingerprint sensing region) corresponding to the opening 408 may be displayed more dimly than a peripheral region while a screen of the display 101 is on.

According to various embodiments, a low shrinkage pigment 410 (for example, black carbon and an organic material) may be injected into an air gap formed corresponding to the opening 408 in order to prevent a phenomenon in which the finger sensor is visible while a screen is off and a phenomenon in which the visibility of a screen corresponding to the fingerprint sensing region deteriorates while a screen is on. The low shrinkage pigment 410 may be fine powder or an additive, which has low shrinkage force, and may prevent transmission of the light (for example, visible light and infrared light) introduced from the outside. The low shrinkage pigment 410 may adjust a transmittance of the light introduced from the outside. For example, when the transmittance is about 50 percent, about 50 percent of visible light and infrared light introduced from the outside may be absorbed by means of the low shrinkage pigment 410. For example, a phenomenon in which the visibility of a screen corresponding to the fingerprint sensing region deteriorates under light of the sun of about 50,000 lux or lower may be prevented when the transmittance of the low shrinkage pigment 410 is about 50 percent while the display 403 is on. That is, a phenomenon in which a screen corresponding to the fingerprint sensing region is dimly displayed may be prevented. A phenomenon in which the fingerprint sensor 420 is visible under light of the sun of about 100,000 lux or lower may be prevented when the transmittance of the low shrinkage pigment 410 is about 50 percent while the display 403 is off. That is, a phenomenon in which the fingerprint sensor 420 disposed below the display 403 is visible to the naked eye may be prevented. According to various embodiments, the air gap formed between the display 403 and the fingerprint sensor 420 may include the low shrinkage pigment 410, and the low shrinkage pigment 410 may prevent a phenomenon in which the fingerprint sensor is visible while a screen is off and a phenomenon in which the visibility of a screen corresponding to the fingerprint sensing region deteriorates while a screen is on.

According to various embodiments, a sensor disposed below the display 403 is not limited to the fingerprint sensor 420. When a sensor is disposed below the display 403, an air gap may be formed between the display 403 and the sensor. According to various embodiments, the low shrinkage pigment 410 may be injected into the air gap, and the low shrinkage pigment 401 may prevent a phenomenon in which a sensor is visible to the naked eye and a phenomenon (for example, a phenomenon in which a region where a sensor is disposed is dimly displayed) in which the visibility of a screen corresponding to a region where a sensor is disposed deteriorates.

According to various embodiments, the light introduced from the outside may be divided into visible rays and infrared rays (IR), and the low shrinkage pigment 410 may equally block the visible rays and the infrared rays.

According to various embodiments, the visibility degradation may indicate a phenomenon in which an image displayed on the display 403 is at least partially blurred or dimly displayed when the user looks at the display 403. An electronic device according to various embodiments may include at least one member and an organic material (for example, the low shrinkage pigment 410) in order to prevent the visibility degradation of a screen corresponding to a region where the fingerprint sensor 420 is disposed.

Figure 5A:
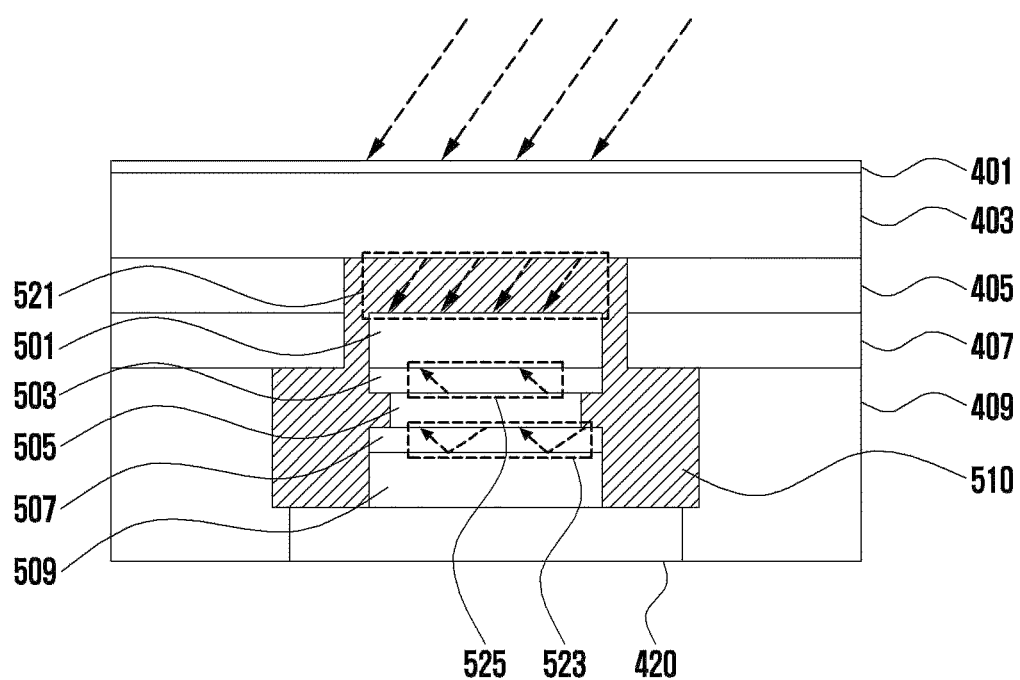
FIGS. 5A and 5B illustrate a first filter disposed corresponding to a fingerprint sensor according to various embodiments of the disclosure.
Figure 5B:
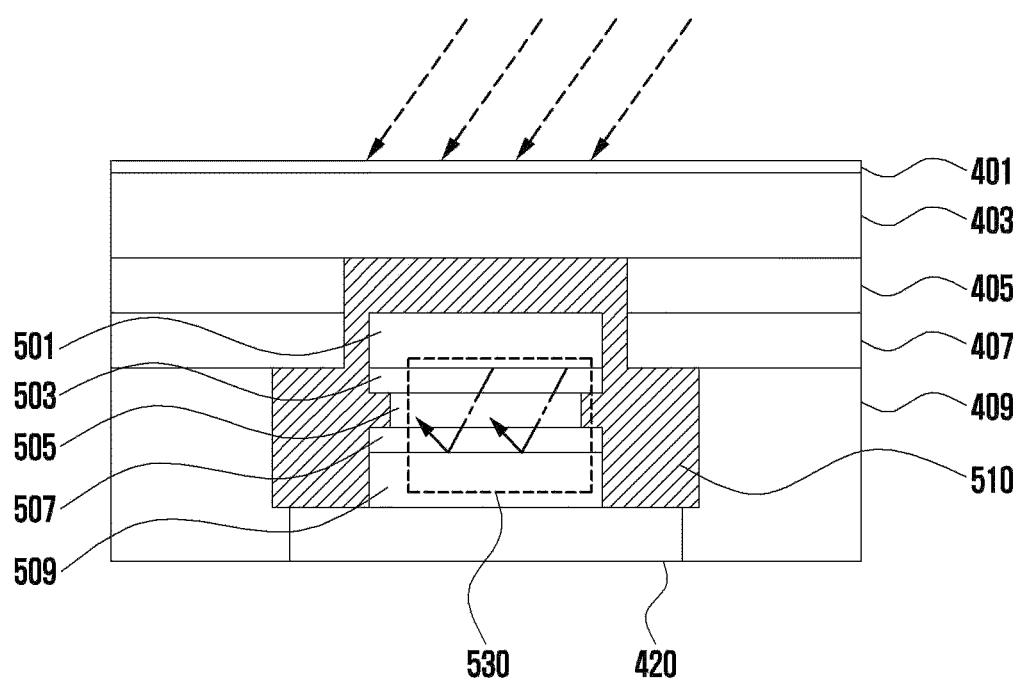

FIGS. 5A and 5B illustrate a first filter disposed corresponding to a fingerprint sensor according to various embodiments of the disclosure.

Referring to FIG. 5A, light may be introduced from the outside through an opening (for example, the opening 408 of FIG. 4) formed through the support member 405 and the metal sheet 407. For example, when light is introduced from the outside, the fingerprint sensor 420 corresponding to the opening may be visible while a screen is off, or a screen corresponding to the opening is dimly displayed while a screen is on. According to various embodiments, a first filter may be disposed on an upper surface of the fingerprint sensor 420 in order to prevent a phenomenon in which the fingerprint sensor 420 is visible and a phenomenon in which a screen is dimly displayed. The first filter may include an infrared-ray absorbing filter 501 for absorbing an infrared ray (IR) and an infrared-ray reflecting filter 509 for reflecting an infrared ray (IR). The first filter may include a blocking member (for example, a first phase delay member 503 (a ¼ retarder), a polarizing member 505 (a linear polarizer, for example, a polarizing film and a polarizing lens), and a second phase delay member 507 (a ¼ retarder)) for blocking a visible ray. An air gap may be formed between the first filter and an opening (for example, the opening 408 of FIG. 4) formed through the support member 405 and the metal sheet 407, and the formed air gap may include an optical transparent adhesive member (an optical clear resin (OCR)) 510 (for example, the low shrinkage pigment 410 of FIG. 4).

The infrared-ray absorbing filter 501 may at least partially absorb infrared rays introduced from the outside and infrared rays reflected by the infrared-ray reflecting filter. The infrared-ray absorbing filter 501 may absorb the introduced infrared rays to prevent a phenomenon in which a screen is dimly displayed when a screen of an electronic device (for example, the electronic device 100 of FIG. 1) is turned on.

The infrared-ray reflecting filter 509 may reflect the infrared rays introduced from the outside to prevent a situation where the infrared rays are introduced into a fingerprint sensor.

The first phase delay member 503 and the second phase delay member 507, which are included in the first filter, may change a rotation direction of the light introduced from the outside. For example, the first phase delay member 503 may change a rotation direction of light so as to enable at least a part of light rotating circularly in a first direction to vibrate linearly in the first direction. The second phase delay member 507 may change a rotation direction of light so as to enable at least a part of the light vibrating linearly in the first direction by means of the first phase delay member 503, to rotate circularly in a second direction. The polarizing member 505 included in the first filter may transmit at least a part of the light traveling from the first phase delay member 503 to the second phase delay member 507, and may transmit at least a part of the light traveling from the second phase delay member 507 to the first phase delay member 503. According to various embodiments, the first filter may partially absorb infrared rays (IR) from the light (for example, infrared rays (IR) and visible rays) introduced from the outside through the opening or partially block visible rays of the light.

The optical transparent adhesive member 510 injected into the air gap formed between the display 403 and the fingerprint sensor 420 may prevent the light from the outside from being reflected, and enables the fingerprint sensor 420 and the display 403 to be bonded to each other. The optical transparent adhesive member 510 may prevent a screen distortion phenomenon and degradation of a user's visibility.

FIG. 5A illustrates a process of blocking and absorbing the infrared rays introduced through the opening. When infrared rays 521 are introduced from the outside, the infrared-ray absorbing filter 501 may absorb at least some of the infrared rays 521. For example, the infrared-ray absorbing filter 501 may absorb about 50 percent of the introduced infrared rays 521. Infrared rays 523 having been transmitted through the infrared-ray absorbing filter 501 may be reflected by an infrared-ray reflecting filter 509. For example, the infrared-ray reflecting filter 509 may reflect about 50 percent of the infrared rays 523 having been transmitted through the infrared-ray absorbing filter 501. At least some of the infrared rays 525 having been reflected by the infrared-ray reflecting filter 509 may be absorbed by the infrared-ray absorbing filter 501. For example, the infrared-ray absorbing filter 501 may absorb about 50 percent of the infrared rays 525 having been reflected by the infrared-ray reflecting filter 509. According to various embodiments, the electronic device 100 may block and absorb the infrared rays introduced from the outside through the opening by means of the first filter disposed on the upper surface of the fingerprint sensor 420.

FIG. 5B illustrates a process of blocking visible rays introduced from the outside through the opening. When visible rays are introduced from the outside, a blocking member (for example, the first phase delay member 503, the polarizing member 505, and the second phase delay member 507) may block at least some of the visible rays. The blocking member may include the first phase delay member 503, the polarizing member 505, and the second phase delay member 507. For example, the visible rays introduced from the outside may be transmitted through the blocking member, but when the visible rays are reflected by the infrared-ray reflecting filter 509, the reflected visible rays 530 may be blocked by the blocking member. Specifically, the visible rays 530 having been reflected by the infrared-ray reflecting filter 509 may be blocked by the polarizing member 505 included in the blocking member.

According to various embodiments, the first filter may be disposed on the upper surface of the fingerprint sensor 420, and the first filter may block or absorb at least a part of the light introduced from the outside through the opening. According to various embodiments, as the light introduced from the outside is at least partially blocked or absorbed, a phenomenon in which a fingerprint sensor is visible while a screen is off and a phenomenon in which a screen corresponding to the fingerprint sensing region is dimly displayed while a screen is on may be prevented.

Figure 6:
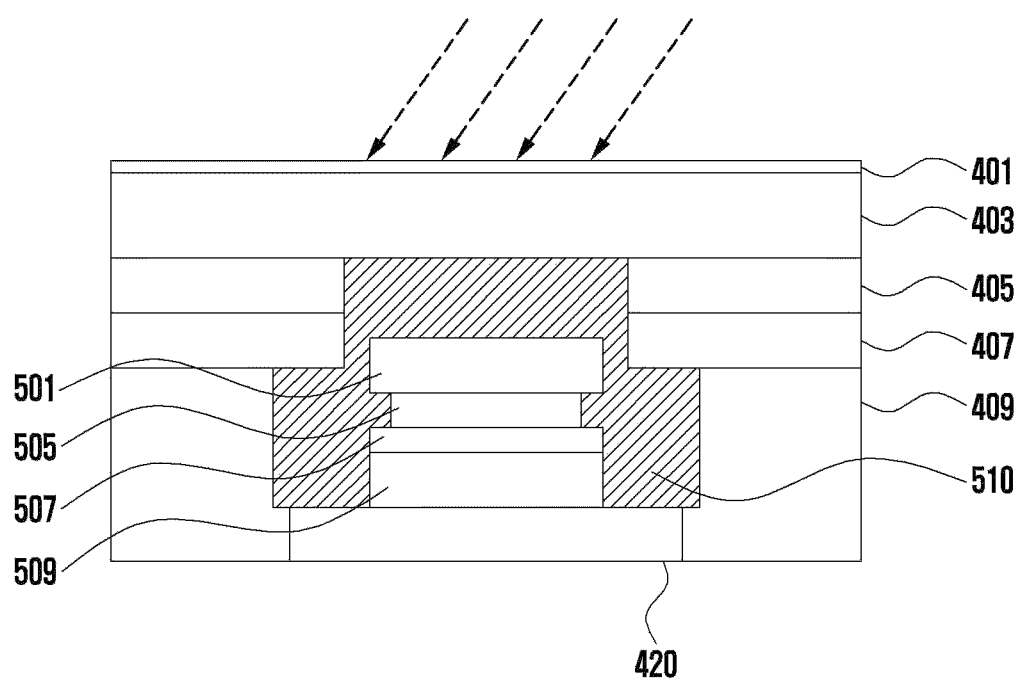
FIG. 6 illustrates a second filter disposed corresponding to a fingerprint sensor according to various embodiments of the disclosure.

FIG. 6 illustrates a second filter disposed corresponding to a fingerprint sensor according to various embodiments of the disclosure.

FIG. 6 illustrates a second filter obtained by removing the first phase delay member (for example, the first phase delay member 503 of FIGS. 5A and 5B) from the first filter illustrated in FIGS. 5A and 5B. The second filter may include the infrared-ray absorbing filter 501, the polarizing member 505, the second phase delay member 507, and the infrared-ray reflecting filter 509. The second filter may have a transmittance reduced by about 45 percent from that of the first filter as the first phase delay member is removed therefrom. However, as viewed by the naked eye, a screen including the first filter and a screen including the second filter may be equally displayed. For example, the second filter may prevent a phenomenon in which the fingerprint sensor 402 is visible under light of the sun of about 50,000 lux or lower while the display 403 (for example, the display 101 of FIG. 1) is on. The second filter may prevent a phenomenon in which a screen corresponding to the fingerprint sensing region is dimly displayed under light of the sun of about 100,000 lux or lower while the display 403 is off. The second filter may be implemented with a simpler structure than that of the first filter.

According to various embodiments, the optical transparent adhesive member 510 (for example, the low shrinkage pigment 410 of FIG. 4) may be injected into an air gap formed between the display 403 and the second filter. The optical transparent adhesive member 510 may prevent the light from the outside from being reflected, and enables the fingerprint sensor 420, the display 403, and the second filter to be bonded to each other. The optical transparent adhesive member 510 may prevent a screen distortion phenomenon and degradation of a user's visibility.

According to various embodiments, the second filter may be disposed on the upper surface of the fingerprint sensor 420, and the second filter may block or absorb at least a part of the light introduced from the outside through the opening. According to various embodiments, as the light introduced from the outside is at least partially blocked or absorbed, a phenomenon in which a fingerprint sensor is visible while a screen is off and a phenomenon in which a screen corresponding to the fingerprint sensing region is dimly displayed while a screen is on may be prevented.

An electronic device according to various embodiments may include: a display panel (for example, the display 403 of FIG. 5A) including a polarizing layer and a phase delay layer disposed below the polarizing layer; an impact absorbing member (for example, the support member 405 of FIG. 5A) disposed below the display panel 403 and having an opening at least partially formed therein; an image sensor (for example, the fingerprint sensor 420 of FIG. 5A) disposed corresponding to the opening; a first phase delay member (for example, the first phase delay member 503 of FIG. 5A) disposed, corresponding to the opening, below the display panel, to enable at least a part of light passing through the polarizing layer and the phase delay layer of the display panel 403 and rotating circularly in a first direction, to vibrate linearly in the first direction; a polarizing member disposed below the first phase delay member to enable at least a part of the light vibrating linearly in the first direction, to be transmitted therethrough; and a second phase delay member (for example, the second phase delay member 507 of FIG. 5A) disposed below the polarizing member to enable at least a part of the light vibrating linearly in the first direction, the light having been transmitted through the polarizing member, to rotate circularly in a second direction. The second phase delay member 507 may block the light through the polarizing member by changing the reflected light rotating circularly in the second direction into the light vibrating linearly in the second direction different from the first direction thereby, the reflected light being obtained by at least a part of the light rotating circularly in the second direction which collides with the image sensor 420 to be reflected toward the second phase delay member.

An electronic device according to various embodiments may further include: an infrared-ray absorbing filter (for example, the infrared-ray absorbing filter 501 of FIG. 5A) disposed between the display panel 403 and the first phase delay member 503 at a position corresponding to the opening; and an infrared-ray reflecting filter (for example, the infrared-ray reflecting filter 509 of FIG. 5A) disposed between the image sensor 420 and the second phase delay member 507 at a position corresponding to the opening.

When the light introduced from the outside is infrared light, an electronic device according to various embodiments may absorb at least a part of the infrared light through the infrared-ray absorbing filter 501.

When the light introduced from the outside is infrared light, an electronic device according to various embodiments may reflect at least a part of the infrared light through the infrared-ray reflecting filter 509 and absorb at least a part of the reflected infrared light through the infrared-ray absorbing filter 501.

An electronic device according to various embodiments may further include an organic material (for example, the optical transparent adhesive member 510 of FIG. 5A) disposed between the display panel 403 and the image sensor 420 to at least partially block transmission of the light introduced from the outside.

According to various embodiments, the organic material 510 may include at least one of a low shrinkage pigment and an additive, and adjust a transmittance of the light.

An electronic device according to various embodiments may further include at least one of a fingerprint sensor, an illuminance sensor, an iris sensor, a proximity sensor, and a camera, and the at least one of a fingerprint sensor, an illuminance sensor, an iris sensor, a proximity sensor, and a camera may be disposed corresponding to the opening.

An electronic device according to various embodiments may include: a display panel (for example, the display 403 of FIG. 5A) including a polarizing layer and a phase delay layer disposed below the polarizing layer; an impact absorbing member (for example, the support member 405 of FIG. 5A) disposed below the display panel 403 and having an opening at least partially formed therein; an image sensor (for example, the fingerprint sensor 420 of FIG. 5A) disposed corresponding to the opening; a polarizing member disposed below the display panel 403, corresponding to the opening, to enable at least a part of light passing through the polarizing layer and the phase delay layer of the display panel 403 to be transmitted therethrough; and a phase delay member disposed below the polarizing member to enable at least a part of the light having been transmitted through the polarizing member to be transmitted therethrough. The phase delay member may have an optical property such that at least a part of the light collides with the image sensor 420 to be reflected toward the phase delay member, and the reflected light is blocked by the polarizing member.

An electronic device according to various embodiments may include: a display panel (for example, the display 403 of FIG. 5A) including a polarizing layer and a phase delay layer disposed below the polarizing layer; an impact absorbing member (for example, the support member 405 of FIG. 5A) disposed below the display panel 403 and having an opening at least partially formed therein; an image sensor (for example, the fingerprint sensor 420 of FIG. 5A) disposed corresponding to the opening; and an organic material (for example, the low shrinkage pigment 410 of FIG. 4) disposed between the display panel 403 and the image sensor 420 to at least partially block transmission of the light introduced from the outside.

An electronic device according to various embodiments disclosed in this document may be various types of devices.

For example, an electronic device may include a portable communication device (for example, a smartphone), a computing device, a portable multimedia device, a portable medical device, a camera, a wearable device, or a home appliance. An electronic device according to an embodiment disclosed in this document is not limited to the devices described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software including one or more instructions that are stored in a storage medium that is readable by a machine. For example, a processor of the machine may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration.

According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
   a display panel including a polarizing layer and a phase delay layer disposed below the polarizing layer;
   an impact absorbing member disposed below the display panel and having an opening at least partially formed therein;
   an image sensor disposed corresponding to the opening;
   a first phase delay member disposed, corresponding to the opening, below the display panel, so as to enable at least a part of light passing through the polarizing layer and the phase delay layer of the display panel and rotating circularly in a first direction to vibrate linearly in the first direction;
   a polarizing member disposed below the first phase delay member to enable at least a part of the light vibrating linearly in the first direction to be transmitted therethrough;
   a second phase delay member disposed below the polarizing member to enable at least a part of the light vibrating linearly in the first direction, the light having been transmitted through the polarizing member, to rotate circularly in a second direction;
   an infrared-ray absorbing filter disposed, corresponding to the opening, between the display panel and the first phase delay member; and
   an infrared-ray reflecting filter disposed, corresponding to the opening, between the image sensor and the second phase delay member,
   wherein at least a part of the light rotating circularly in the second direction is reflected with the infrared-ray reflecting filter to be transmitted toward the second phase delay member, and
   wherein the reflected light rotating circularly in the second direction is changed to the light vibrating linearly in the second direction, which is different from the first direction, based on the second phase delay member so as to be absorbed by the infrared-ray absorbing filter.

2. The electronic device of claim 1, wherein, in a case that light introduced from outside includes infrared light, at least a part of the infrared light is absorbed through the infrared-ray absorbing filter.

3. The electronic device of claim 1, wherein, in a case that light introduced from outside includes infrared light, at least a part of the infrared light is reflected by the infrared-ray reflecting filter, and wherein at least a part of the reflected infrared light is absorbed through the infrared-ray absorbing filter.

4. The electronic device of claim 1, further comprising an organic material disposed between the display panel and the image sensor to at least partially block transmission of light introduced from outside.

5. The electronic device of claim 4, wherein the organic material includes at least one of a low shrinkage pigment or an additive, and adjusts a transmittance of the light.

6. The electronic device of claim 1, further comprising at least one of a fingerprint sensor, an illuminance sensor, an iris sensor, a proximity sensor, or a camera, wherein the at least one of a fingerprint sensor, an illuminance sensor, an iris sensor, a proximity sensor, or a camera is disposed corresponding to the opening.

7. An electronic device comprising:

a display panel including a polarizing layer and a phase delay layer disposed below the polarizing layer;

an impact absorbing member disposed below the display panel and having an opening at least partially formed therein;

an image sensor disposed corresponding to the opening;

a polarizing member disposed, corresponding to the opening, below the display panel, so as to enable at least a part of light passing through the polarizing layer and the phase delay layer of the display panel to be transmitted therethrough;

a phase delay member disposed below the polarizing member to enable at least a part of the light having been transmitted through the polarizing member to be transmitted therethrough;

an infrared-ray absorbing filter disposed, corresponding to the opening, between the display panel and the polarizing member; and an infrared-ray reflecting filter disposed, corresponding to the opening, between the image sensor and the phase delay member, wherein the at least a part of the light passing through the phase delay member is reflected with the infrared-ray reflecting filter to be transmitted toward the phase delay member, and wherein the light reflected by the infrared-ray reflecting filter is absorbed by the infrared-ray absorbing filter.

8. The electronic device of claim 7, wherein, in a case that light introduced from outside includes infrared light, at least a part of the infrared light is absorbed through the infrared-ray absorbing filter.

9. The electronic device of claim 7, wherein, in a case that light introduced from outside includes infrared light, at least a part of the infrared light is reflected by the infrared-ray reflecting filter, and wherein at least a part of the reflected infrared light is absorbed through the infrared-ray absorbing filter.

10. The electronic device of claim 7, further comprising an organic material disposed between the display panel and the image sensor to at least partially block transmission of light introduced from outside.

* * * * *